United States Patent [19]

Sugawara et al.

[11] Patent Number: 4,607,094
[45] Date of Patent: Aug. 19, 1986

[54] THERMOSETTING RESIN COMPOSITION FROM AROMATIC CYANAMIDE

[75] Inventors: Katuo Sugawara, Hitachi; Akio Takahashi, Hitachiohta; Masahiro Ono, Hitachi; Ritsuro Tada, Mito; Motoyo Wajima, Hitachi; Toshikazu Narahara, Toukai; Akira Nagai, Hitachi, all of Japan

[73] Assignee: Hitachi, Ltd., Tokyo, Japan

[21] Appl. No.: 697,530

[22] Filed: Feb. 1, 1985

[30] Foreign Application Priority Data

Feb. 3, 1984 [JP] Japan .................................. 59-17037

[51] Int. Cl.$^4$ ........................................... C08G 69/14
[52] U.S. Cl. .................................... 528/323; 428/426; 428/704; 528/172; 528/210; 528/211; 528/322; 528/326; 528/354; 528/359; 528/422
[58] Field of Search ............... 528/323, 326, 322, 354, 528/359, 422, 210, 211, 172

[56] References Cited

U.S. PATENT DOCUMENTS 4,482,703 11/1984 Takahashi et al. .................. 528/322
4,486,583 12/1984 Takahashi et al. .................. 528/422

Primary Examiner—Harold D. Anderson
Attorney, Agent, or Firm—Antonelli, Terry & Wands

[57] ABSTRACT

The thermosetting resin composition of the present invention is prepared by mixing an aromatic cyanamide compound with a cyclic ester compound and/or a cyclic amide compound. Although a solventless type composition is preferable, the present invention is not limited thereto. The cured product of the present invention can be prepared by heating and curing said thermosetting resin composition. The obtained cured product of the present invention usually contains melamine rings, isomelamine rings and linear polyester and/or a linear polyamide units.

8 Claims, 3 Drawing Figures

THERMOSETTING RESIN COMPOSITION FROM AROMATIC CYANAMIDE

BACKGROUND OF THE INVENTION

1. Field of the Invention

The present invention relates to a thermosetting resin composition, its cured product, and a process for producing this cured product, and particularly relates to a thermosetting resin composition applicable to various resin products for which an electrical insulating property, mold-ability and heat resistance are required, such as printed circuit boards, resin-sealed semiconductors, and resin-impregnated coils, its cured product, and a process for producing this cured product.

2. Description of the Prior Art

Polyaddition type polyimides such as bismaleimide are well-known examples of the resins of heat resistance class H. On the other hand, a homopolymer of aromatic dicyanamide is also known as a heat-resistant resin (See British Pat. No. 1322332). Although this polymer is more excellent in respect of heat resistance than the above polyimides, it is lacking in flexibility, so that it is extremely unsuitable for films, coating materials, prepreg materials and molding materials. Besides, a solvent is necessary to prepare a casting material from the aromatic dicyanamide because it is in the form of powder, and the use of a solvent gives rise to problems such as void formation and dimensional discrepancy, so that it is extremely unsuitable as a molding material.

SUMMARY OF THE INVENTION

It is an object of the present invention to provide a thermosetting resin composition excellent in moldability and capable of dispensing with any solvent though it is derived from an aromatic dicyanamide, a cured product obtained by heating and curing this resin composition, and a process for producing the cured product.

The thermosetting resin composition of the present invention is prepared by mixing an aromatic cyanamide compound with a cyclic ester compound and/or a cyclic amide compound. Although a solventless type composition is preferable, the present invention is not limited thereto. The cured product of the present invention can be obtained by heating and curing this thermosetting resin composition. The obtained cured product of the present invention usually contains melamine rings, isomelamine rings, and linear polyester and/or linear polyamide units.

(Aromatic cyanamide compounds)

Typical aromatic cyanamide compounds used in the present invention are represented by the following formula [I]:

   [I]

wherein A is an organic group having at least one aromatic ring, $R_1$ is selected from the group consisting of hydrogen, a benzenesulfonyl group, and a benzyl group, and n is an integer equal to or greater than 1.

This aromatic cyanamide compound forms melamine and isomelamine rings in the cured product of the present invention. These ring groups constitute the heat-resistant skeleton of the cured product.

Examples of the melamine rings are represented by the following formula [II], while those of the isomelamine rings are represented by the following formula [III].

In these formulas, the symbols are the same as defined in formula [I].

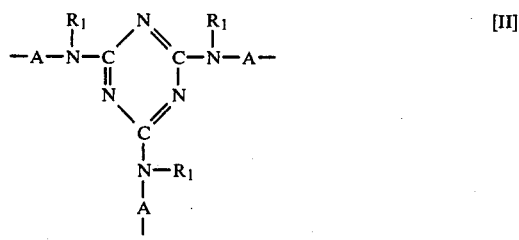

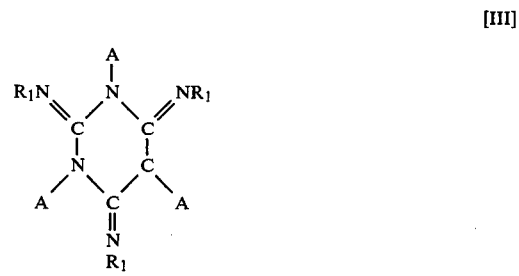

The aromatic cyanamide compound used in the present invention comprises at least one member selected from the group consisting of, for example, m-phenylenedicyanamide, p-phenylenedicyanamide, 4,4'-dicyanamidodiphenylmethane, 2,2'-bis(4-cyanamidophenyl)propane, 4,4'-dicyanamidophenyl oxide, 4,4'-dicyanamidodiphenyl sulfone, bis(4-cyanamidophenyl)-phosphine oxide, bis(4-dicyanamidophenyl)phenylphosphine oxide, bis(4-cyanamidophenyl)methylamine, 1,5-dicyanamidonaphthalene, m-xylylenedicyanamide, 1,1,-bis(p-cyanamidophenyl)furan, p-xylylenedicyanamide, hexamethylenedicyanamide, 6,6'-dicyanamido-2,2'-dipyridyl, 4,4'-dicyanamidobenzophenone, 4,4'-dicyanamidoazobenzene, bis(4-cyanamidophenyl)-phenylmethane, 1,1-bis(4-cyanamidophenyl)cyclohexane, 1,1-bis(4-cyanamido-3-methylphenyl)-1,3,4-oxadiazole, 4,4'-dicyanamidodiphenyl ether, 4,4'-bis(p-cyanamidophenyl)- 2,2'-dithiazole, m-bis(4-p-cyanamidophenyl-2-thiazole)benzene, 4,4'-dicyanamidobenzanilide, 4,4'-dicyanamidophenyl benzoate, 2,2'-bis[4-(4-cyanamidophenoxy)phenyl]propane, 2,2'-bis[3-methyl-4-(4-cyanamidophenoxy)phenyl]propane, 2,2-bis[3-ethyl-4-(4-cyanamidophenoxy)phenyl]propane, 2,2-bis[3-propyl-4-(4-cyanamidophenoxy)phenyl]propane, 2,2-bis[3-isopropyl-4-(4-cyanamidophenoxy)phenyl]propane, bis[4-(4-cyanamidophenoxy)phenyl]methane, and cyanamido-terminated sulfone ether oligomer represented by the following formula [IV]:

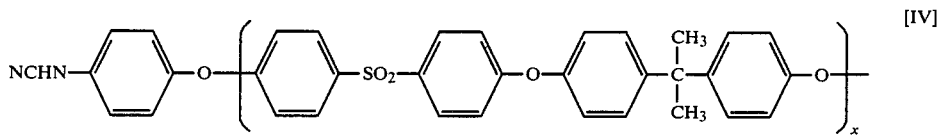

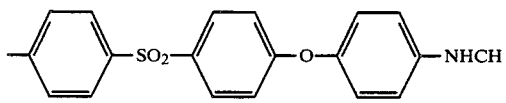

(Cyclic ester compounds)

Typical cyclic ester compounds used in the present invention are represented by the following formula [V]:

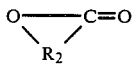

wherein R₂ is a bivalent organic group.

It can be presumed that the cyclic ester compound forms a linear polyester as represented by the following formula [VI]:

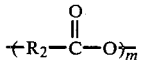

wherein m is an integer equal to or greater than 2, and R₂ is as defined in formula [V].

This linear polyester imparts flexibility, especially impact resistance, to the cured product.

Although the cyclic ester compound is effective in bringing the powdery aromatic cyanamide compound into a liquid state (in this sense, the cyclic ester acts as a solvent), it not only acts as a solvent but constitutes a component of the cured product after curing. Meanwhile, although this compound is not thermally cured by itself and requires a catalyst for curing, it can undergo an uncatalyzed curing reaction when it is combined with the aromatic cyanamide compound.

Examples of the cyclic ester compounds used in the present invention include β-propiolactone, β-butyrolactone, pivalolactone, γ-butyrolactone, γ-valerolactone, δ-valerolactone, γ-caprolactone, ε-caprolactone, α,γ-trimethylene-γ-butyrolactone, α,γ-dimethyl-α,γ-trimethylene-γ-butyrolactone, α-anilino-γ-phenyl-γ-butyrolactone, β,δ-dimethyl-δ-valerolactone, α,δ-ethylene-δ-valerolactone, α,δ-ethylene-α,δ-dimethyl-δ-valerolactone, 4-methyl-2-butenolactone, phthalide, coumarin, 3,4-dihydrocoumarin, α,β-dibenzoyloxy-γ-butyrolactone, 2-isobutyl-1-methylcyclopropanecarboxylic acid hemiketal lactone and α-ethyl-γ,γ-dihydroxypimelic acid dilactone.

(Cyclic amide compounds)

Typical cyclic amide compounds used in the present invention are represented by the following formula [VII]:

The reason why an aromatic cyanamide compound is used in the present invention is that the aromatic compound is advantageous in respect of heat resistance.

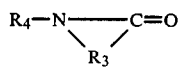

wherein R₃ is a bivalent organic group and R₄ is hydrogen or a monovalent group.

It can be presumed that this cyclic amide compound forms a linear polyamide such as the one represented by the following formula [VIII]:

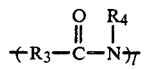

wherein 1 is an integer equal to or greater than 2, and R₃ and R₄ are as defined in formula [VII], in the cured product of the present invention.

This linear polyamide is similar to the linear polyester in that it imparts flexibility, especially impact resistance, to the cured product.

Like the cyclic ester compound, the cyclic amide compound is liquid, but it not only acts as a simple solvent, but also constitutes a component of the cured product after curing. Although, like the cyclic ester compound, this cyclic amide compound is not thermally cured by itself and requires a catalyst for curing, it can undergo an uncatalyzed curing reaction when it is combined with the aromatic cyanamide compound.

Examples of the cyclic amide compounds used in the present invention include glycine anhydride, azetidinone, γ-butyrolactam, N-methyl-2-pyrrolidone, N-vinylpyrrolidone, δ-valerolactam, 3,4-dihydro-2-quinolone, ε-caprolactam, α-methylcaprolactam, ε-methylcaprolactam, γ-methylcaprolactam, α-vinylpyrrolidone, δ-methylcaprolactam, ε-methylcaprolactam, N-methylcaprolactam, ω-enantholactam, ω-caprylolactam, β,γ-dimethylcaprolactam, γ-ethylcaprolactam, γ-isopropylcaprolactam, ε-isopropylcaprolactam, γ-butylcaprolactam, γ-hexacyclobenzylcaprolactam, α-azabicyclo[3.2.1]-octane-3-one, 2-azabicyclo[3.2.2]nonan-3-one, 6-azabicyclo[2.2.3]octane-3-one, and 6-azabicyclo[3.2.1]octan-7-one.

(Curing catalysts)

Although, as mentioned above, the dicyanamide compound and the cyclic amide compound can cure in the absence of any catalyst if their kinds and curing conditions are suitably selected, it is also possible to add, for example, a catalyst which accelerates the ring opening reaction of the cyclic amide compound or the cyclic ester compound.

Examples of the polymerization catalysts for the cyclic amide compound include H₂SO₄, α-alanine, β-alanine, hexamethylenediamine hydrochloride, phsophoric acid, boric acid, $NaH_2PO_2$, $Na_2HPO_3$, Na, NaOH, $Na_2CO_3$, NaH, $CH_3$-MgBr Grignard reagent, $C_2H_5$-MgBr Grignard reagent, and $SnCl_4$.

Examples of the polymerization catalysts for the cyclic ester compound include (i) organic amines such as phenylnaphthylamine, pyridine, dimethylaniline, trimethylamine, and trimethylamine oxide, (ii) Lewis acids such as boron trifluoride, anhydrous ferric chloride, anhydrous stannic chloride cupric chloride, and titanium tetrachloride, (iii) boron trifluoride/amine complexes such as boron trifluoride/monoethylamine complex and boron trifluoride/piperidine complex, and (iv) organophosphorus compounds such as triphenylphosphine sulfide, dihexylphosphine oxide, trioctylphosphine oxide, and triphenylphosphine.

Although the amounts of the above catalysts are not particularly limited, it is preferable that they are 0.01 to 5% by weight, particularly 0.1 to 2% by weight, based on the total weight of the composition. It is also possible to use these catalysts in the form of a suitable combination.

(Mixing ratio)

The composition of the present invention can afford good cured products, varnishes, etc., even when the mixing ratio among its components is varies relatively widely. Although the mixing ratio may thus be determined according to its intended use and in no way limited, it is preferable that the total amount of the cyclic ester compound and/or the cyclic amide compound is 5 to 250 parts by weight per 100 parts by weight of the aromatic cyanamide compound.

Other components added)

The resin composition of the present invention may contain, if necessary, well-known additives such as organic fillers, inorganic fillers, glass fiber, organic fibers, flame retardants, flexibilizers, pigments, coupling agents, and mold releases. It is also possible to mix the resin composition of the present invention with other materials such as another thermosetting resin and cure the mixture in a variety of ways.

The composition of the present invention can be brought into a liquid state by suitably selecting the kinds and ratio of the cyclic ester compound and/or the cyclic amide compound to be mixed with the aromatic cyanamide compound, and used, as such, as a varnish for impregnation or casting, that is, it is particularly effective as a cyanamide resin composition which requires no other solvents, i.e., of a solventless type. However, it is also possible to use other solvents in the present invention without any objections.

(Cured products and varnishes)

With regard to the properties of the cured product of the present invention, its heat resistance is enhanced and its hardness is increased as the mixing ratio of the aromatic cyanamide compound is increased, while there is a tendency of forming a cured product rich in flexibility as the above ratio is decreased. Further, with regard to the properties of a compound varnish, the viscosity is reduced and the fluidity is increased as the mixing ratio of the cyclic ester compound or the cyclic amide compound is increased.

It may be presumed that a cured product of the aromatic cyanamide compound/cyclic ester compound system has melamine rings (a trimer of the cyanamide compound), isomelamine rings (likewise, a trimer of the cyanamide compound) and a linear polyester (a ring opening polymer of the cyclic ester compound) unit. The IR spectrum absorption of the melamine ring is 1590 $cm^{-1}$, that of the isomelamine ring is 1620 $cm^{-1}$, and that of the linear polyester is 1720 $cm^{-1}$.

It may be presumed that a cured product of the aromatic cyanamide compound/cyclic amide compound system has melamine rings, isomelamine rings and a linear polyamide (a ring opening polymer of the cyclic amide compound) unit. The IR absorption of the linear polyamide is 1640 $cm^{-1}$.

It may be presumed that a cured product of the aromatic cyanamide compound/cyclic ester compound/cyclic amide compound system contains melamine rings, isomelamine rings, a linear polyester unit and a linear polyamide unit.

In any case, it is possible without any objection that a variety of reactions (for example, reactions among the melamine rings, the isomelamine rings, the amide unit and the ester unit) in each of the cured products.

When a solventless type composition is used, problems due to solvent evaporation such as void formation or dimensional discrepancy can be solved.

(Curing methods)

The curing of the thermosetting resin composition of the present invention can be accomplished merely by heating it in a suitable manner. For example, the composition can be cured into a tough product when it is heated at 150° to 300° C. for 10 minutes to 30 hours, especially when this heating is carried out in several stages.

(Use)

The resin after curing is excellent in electrical properties, chemical resistance, impact resistance, and self-extinguishability, so that it finds wide applications such as casting resins, impregnating resins, mold resins for electronic parts, resins for coating materials, resins for laminated sheets, resins for print wiring, interior resins, resins for FRP, and other resins for structural materials.

[EFFECTS OF THE INVENTION]

As described above, the present invention is effective in obtaining a thermosetting resin composition excellent in moldability and capable of dispensing with any solvent though it is derived from an aromatic dicyanamide and in affording a cured product which is excellent in mechanical properties at high temperatures, impact resistance, and heat resistance and especially when the composition used is of a solventless type, a cured product which has excellent dimensional accuracy.

DETAILED DESCRIPTION OF THE PREFERRED EMBODIMENTS

Examples 1 through 10

Figure 1:
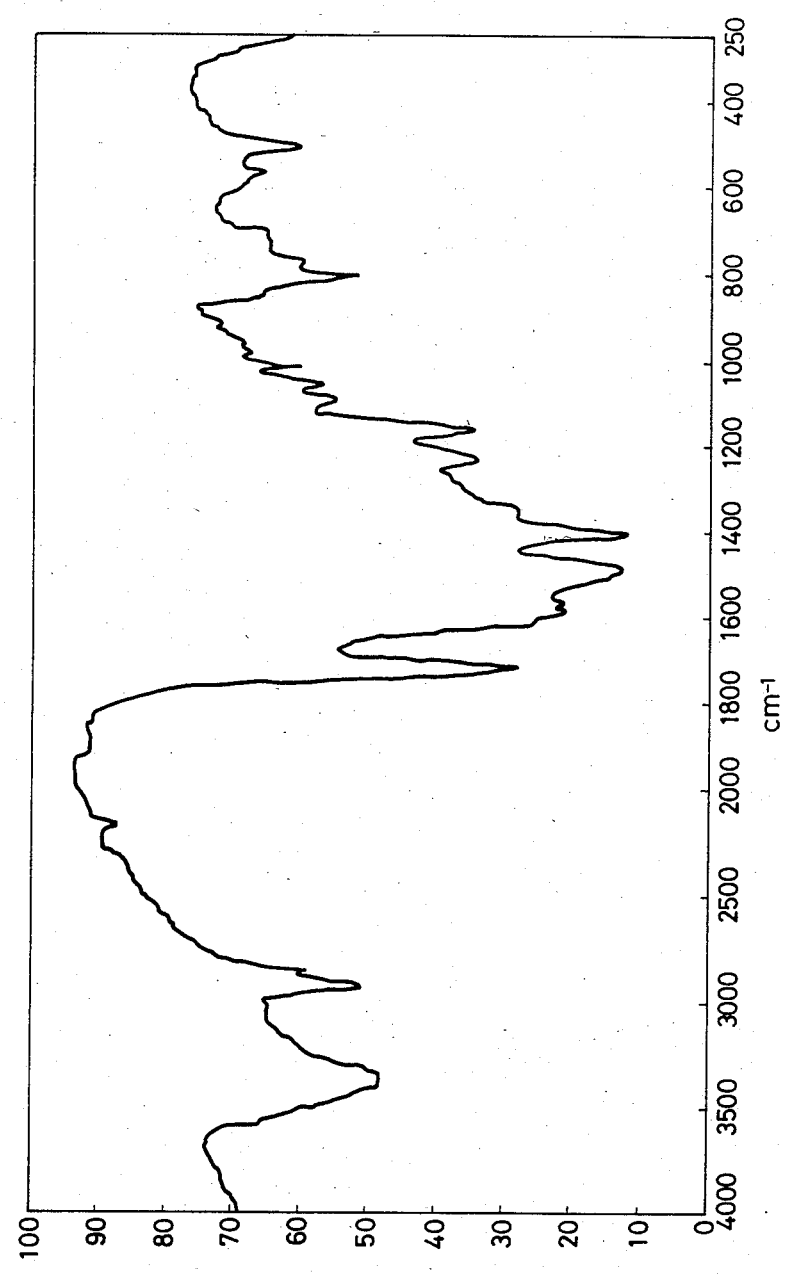
FIGS. 1 through 3 are the IR spectrum of the cured products in the examples of the present invention.

An aromatic cyanamide compound and a cyclic ester compound as shown in Table 1 were mixed together under stirring at 80° C. for 30 minutes to form a liquid composition. This liquid composition was poured into a mold, vacuum-defoamed and heated under a curing condition of 120° C./5 hr+150° C./5 hr+180° C./5 hr+200° C./5 hr+250° C./10 hr to obtain a cured.

product. The obtained cured product was yellow-brown transparent resin. Table 2 shows the weight loss initiating temperature, glass transition point and tensile properties of each of the cured products. The weight loss initiating temperature is a value obtained when the sample was heated in air at a rate of temperature rise of 5° C./min.

TABLE 1

| Example No. | 4,4'-dicyanamido-diphenylmethane (parts by weight) | 4,4'-dicyanamido-diphenyl ether (parts by weight) | ε-caprolactone (parts by weight) | γ-butyrolactone (parts by weight) | triphenylphosphine (parts by weight) |
|---|---|---|---|---|---|
| 1 | 100 | — | 100 | — | 1 |
| 2 | 100 | — | 100 | — | — |
| 3 | 100 | — | 80 | — | — |
| 4 | 100 | — | — | 100 | — |
| 5 | 100 | — | — | 80 | — |
| 6 | 50 | 50 | 100 | — | — |
| 7 | 50 | 50 | 50 | 50 | — |
| 8 | — | 100 | 100 | — | 1 |
| 9 | — | 100 | 100 | — | — |
| 10 | — | 100 | 80 | — | — |

TABLE 2

| Example No. | weight loss initiating temperature (°C.) | glass transition point (°C.) | mechanical properties | | Izod impact strength* (kg·cm/cm) |
|---|---|---|---|---|---|
| | | | tensile properties | | |
| | | | strength (kg/cm²) | elongation (%) | |
| 1 | 330 | 260 | 480 | 10 | 10 |
| 2 | 310 | 240 | 440 | 14 | 16 |
| 3 | 330 | 260 | 500 | 8 | 8 |
| 4 | 320 | 240 | 450 | 8 | 8 |
| 5 | 330 | 260 | 480 | 6 | 7 |
| 6 | 330 | 240 | 460 | 11 | 13 |
| 7 | 330 | 240 | 450 | 8 | 8 |
| 8 | 330 | 260 | 470 | 10 | 10 |
| 9 | 320 | 240 | 460 | 11 | 13 |
| 10 | 330 | 260 | 490 | 7 | 8 | measurement temperature ... room temperature
*a rod (3.17 × 3.17 mm)

Examples 11 through 15

An aromatic cyanamide compound and a cyclic ester compound as shown in Table 3 were dissolved in methyl ethyl ketone (solid content of 30%), and heated at 70° C. for 90 minutes to form a prepolymer. This varnish was infiltrated into a 0.18 mm thick, aminosilane-treated glass cloth and dried at 100° C. for about 10 minutes to form a coated cloth. Ten sheets of this cloth were laid upon one another and pressure-molded at a pressure of 20 kg/cm² under a curing condition of 150° C./1 hr+200° C./2 hr+250° C./2 hr to form a laminated sheet. Table 4 shows the weight loss initiating temperature and bending strength ratio of each of the laminated sheets. The bending strength ratio is a retention ratio of a bending strength at a given temperature to that at room temperature (20° C.).

TABLE 3

| Example No. | 4,4'-dicyanamido-diphenylmethane (parts by weight) | ε-caprolactone (parts by weight) | γ-butyrolactone (parts by weight) | triphenylphosphine (parts by weight) |
|---|---|---|---|---|
| 11 | 100 | 10 | — | — |
| 12 | 100 | 20 | — | — |
| 13 | 100 | 50 | — | — |
| 14 | 100 | 50 | — | 1 |
| 15 | 100 | — | 20 | — |

TABLE 4

| Example No. | weight loss initiating temperature (°C.) | bending strength ratio (%) | | |
|---|---|---|---|---|
| | | 100° C. | 180° C. | 220° C. |
| 11 | 400 | 98 | 88 | 77 |
| 12 | 370 | 88 | 84 | 73 |
| 13 | 340 | 85 | 80 | 70 |
| 14 | 360 | 95 | 87 | 78 |
| 15 | 380 | 97 | 88 | 76 |

Example 16

According to the procedure of Examples 1 through 15, 1 mol of 4,4'-dicyanamidodiphenylmethane and 2 mol of ε-caprolactone were mixed together and cured under a curing condition of 120° C./1 hr+180° C./15 hr+200° C./2 hr. FIG. 1 is an IR spectrum of the cured product, indicating that it has absorptions near 1590 $cm^{-1}$, near 1620 $cm^{-1}$, and near 1720 $cm^{-1}$.

Example 17

45 parts by weight of 4,4'-dicyanamidodiphenylmethane was reacted with 30 parts by weight of γ-butyrolactam at 60° to 80° C. for about 60 minutes to form a varnish, and this varnish was poured into a mold and cured therein under a curing condition of 160° C./2 hr+200° C./2 hr+250° C./10 hr to form a resin plate.

Example 18

45 parts by weight of 4,4'-dicyanamidodiphenylmethane was reacted with 30 parts by weight of ε-caprolactam at 60° to 80° C. for about 60 minutes to form a varnish, and this varnish was poured into a mold and cured therein under a curing condition of 160° C./2 hr+200° C./5 hr+250° C./5 hr to form a resin plate.

Example 19

45 parts by weight of 4,4'-dicyanamidodiphenylmethane was reacted with 30 parts by weight of γ-butyrolactam and 2 parts by weight of α-alanine at 60° to 80° C. for about 60 minutes to form a varnish, and this varnish was poured into a mold and cured therein under a curing condition of 160° C./2 hr+200° C./2 hr+250° C./5 hr to form a resin plate.

Table 5 shows the weight loss initiating temperatures and mechanical properties of the cured products. The values of the weight loss initiating temperatures were those determined when the samples were heated in air at a rate of temperature rise of 5° C./min.

TABLE 5

| Example No. | weight loss initiating temperature (°C.) | Mechanical properties | | |
|---|---|---|---|---|
| | | tensile properties | | Izod impact strength* (kg · cm/cm) |
| | | strength (kg/cm²) | elongation (%) | |
| 17 | 350 | 450 | 10 | 9 |
| 18 | 340 | 430 | 12 | 12 |
| 19 | 360 | 480 | 8 | 7 | measurement temperature ... room temperature
*a rod (3.17 × 3.17 mm)

Example 20

Figure 2:
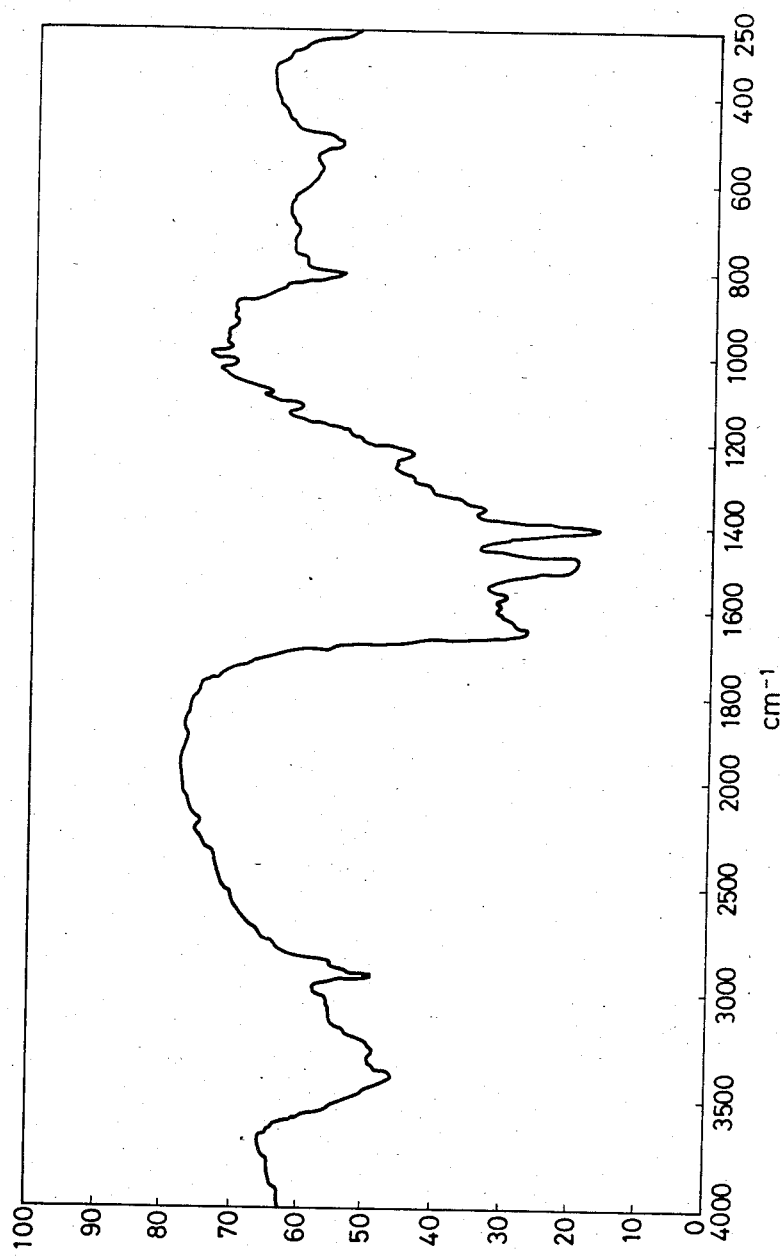

According to the procedure of Examples 17 through 19, 1 mol of 4,4'-dicyanamidodiphenylmethane and 2 mol of ε-caprolactam were mixed together and cured under a curing condition of 120° C./1 hr+180° C./15 hr+200° C./2 hr. FIG. 2 is an IR spectrum of the cured product, indicating that it has absorptions near 1590 cm$^{-1}$, near 1620 cm$^{-1}$ and near 1640 cm$^{-1}$.

Examples 21 through 25

An aromatic cyanamide compound, a cyclic ester compound and a cyclic amide compound as shown in Table 6 were mixed together at 80° C. for 30 minutes to form a liquid composition. This liquid composition was poured into a mold, vacuum-defoamed, and heated under a curing condition of 120° C./5 hr+150° C./5 hr+180° C./5 hr+ 200° C./5 hr+250° C./10 hr to obtain a cured product. The obtained cured product was yellow-brown transparent resin. Table 7 shows the weight loss initiating temperature and mechanical properties of the cured product.

TABLE 6

| Example No. | 4,4'-dicyanamido-diphenylmethane (parts by weight) | ε-caprolactone (parts by weight) | ε-caprolactam (parts by weight) |
|---|---|---|---|
| 21 | 100 | 20 | 80 |
| 22 | 100 | 40 | 60 |
| 23 | 100 | 60 | 40 |
| 24 | 100 | 80 | 20 |
| 25 | 100 | 40 | 40 |

TABLE 7

| Example No. | weight loss initiating temperature (°C.) | Mechanical properties | | |
|---|---|---|---|---|
| | | tensile properties | | Izod impact strength* (kg · cm/cm) |
| | | strength (kg/cm²) | elongation (%) | |
| 21 | 330 | 440 | 10 | 11 |
| 22 | 340 | 450 | 10 | 10 |
| 23 | 340 | 450 | 0 | 9 |
| 24 | 350 | 470 | 8 | 9 |
| 25 | 360 | 490 | 6 | 8 | measurement temperature ... room temperature
*a rod (3.17 × 3.17 mm)

The weight loss initiating temperatures were those obtained when the samples were heated in air at a rate of temperature rise of 5° C./min.

Example 26

Figure 3:
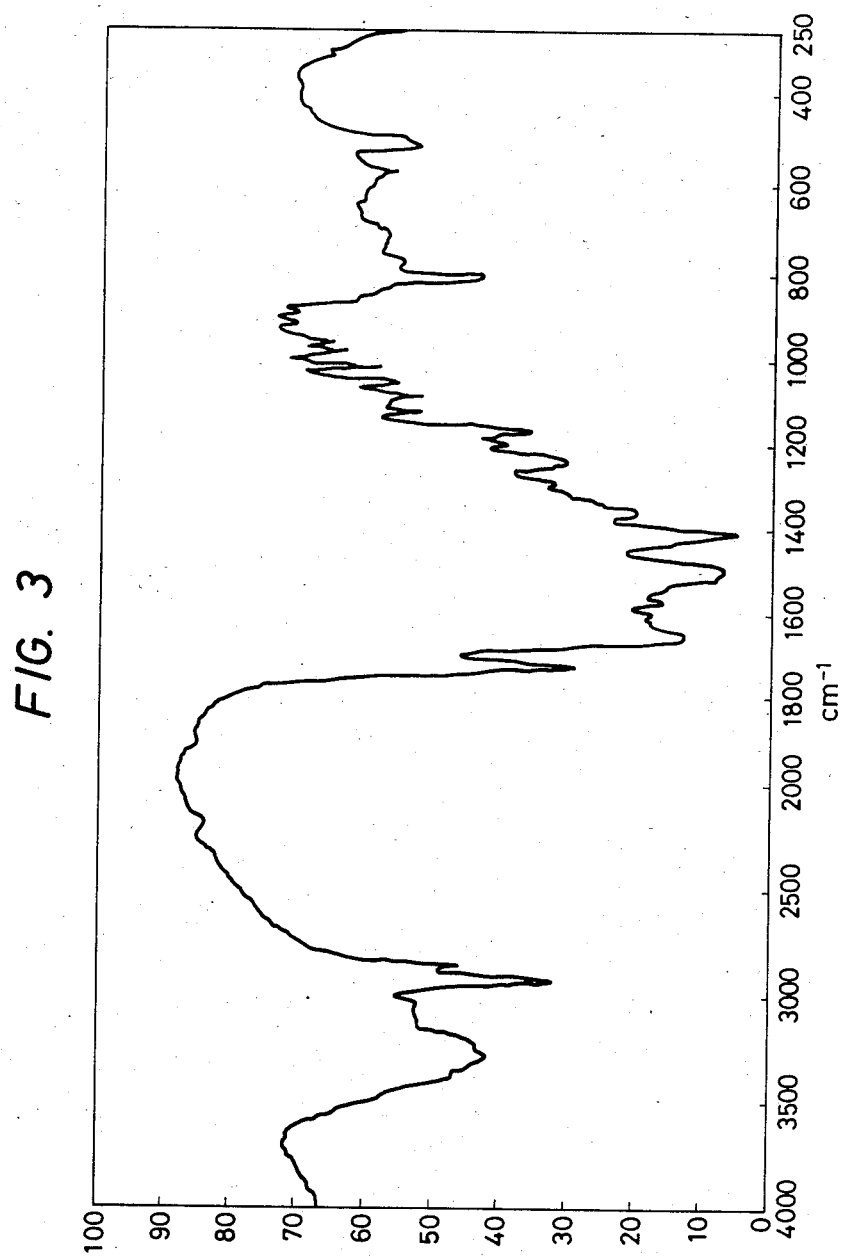

According to the procedure of Examples 21 through 25, a mixture of 1 mol of 4,4'-dicyanamidodiphenylmethane, 1 mol of ε-caprolactam was cured under a curing condition of 120° C./1 hr+180° C./15 hr+200° C./2 hr. FIG. 3 is an IR spectrum of the cured product, indicating that it has absorptions near 1590 cm$^{-1}$, near 1620 cm$^{-1}$, near 1640$^{-1}$ and near 1720 cm$^{-1}$.

We claim:

1. A thermosetting resin composition prepared by mixing an aromatic cyanamide compound with at least one cyclic compound selected from the group consisting of a cyclic ester compound and a cyclic amide compound.

2. A thermosetting resin composition as defined in claim 1, wherein said aromatic cyanamide compound is represented by the following formula:

$$A(\!-\!NR_1CN)_n$$

wherein A is an organic group having at least one aromatic ring, $R_1$ is hydrogen, a benzenesulfonyl group or a benzyl group, and n is an integer equal to or greater than 1.

3. A thermosetting resin composition as defined in claim 1, wherein the total of the amounts of said cyclic compounds is 5 to 250 parts by weight per 100 parts by weight of said aromatic cyanamide compound.

4. A thermosetting resin composition as defined in claim 1, wherein no solvent other than said cyclic compound is incorporated therein.

5. A cured product of a thermosetting resin comprising a linear polymer structure having (1) melamine ring units, (2) isomelamine ring units, and at least one unit selected from the group consisting of (3) polyamide unit derived from a cyclic amide compound and (4) polyester unit derived from a cyclic ester compound.

6. A cured product as defined in claim 5, wherein said melamine ring is represented by the following formula [II] and said isomelamine ring is represented by the following formula [III];

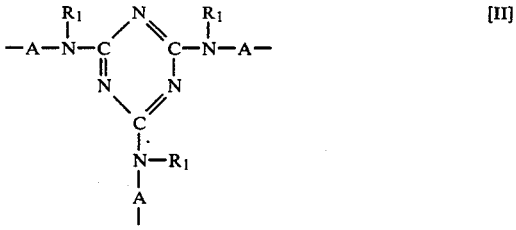

[II]

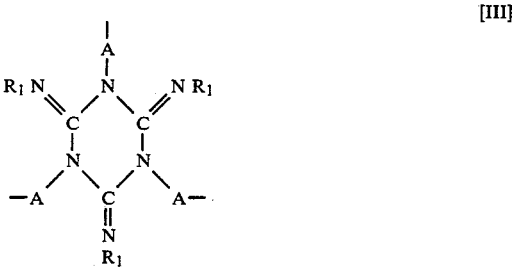

[III]

wherein A is an aromatic group having at least one aromatic ring, $R_1$ is hydrogen, a benzenesulfonyl group or a benzyl group.

7. A process for producing a cured product comprising: heating and curing a mixture of an aromatic cyanamide compound and a cyclic compound selected from the group consisting of cyclic ester compounds and cyclic amide compounds to thereby produce a resin having a linear polymer structure unit, melamine rings and isomelamine rings.

8. A process for producing a cured product as defined in claim 7, wherein said aromatic cyanamide compound is represented by the following formula:

$$A\text{-}(NR_1CN)_n$$

wherein A is an organic group having at least one aromatic ring, $R_1$ is hydrogen, a benzenesulfonyl group, or a benzyl group, and n is an integer equal to or greater than 1.

* * * * *